July 14, 1959     H. A. QUIST     2,894,394
SAMPLER FOR FOAM BLANKET COVERED LIQUIDS
Filed June 12, 1956     2 Sheets-Sheet 1

INVENTOR.
HAROLD A. QUIST

BY Robert O. Spindle

ATTORNEY

July 14, 1959 H. A. QUIST 2,894,394
SAMPLER FOR FOAM BLANKET COVERED LIQUIDS
Filed June 12, 1956 2 Sheets-Sheet 2
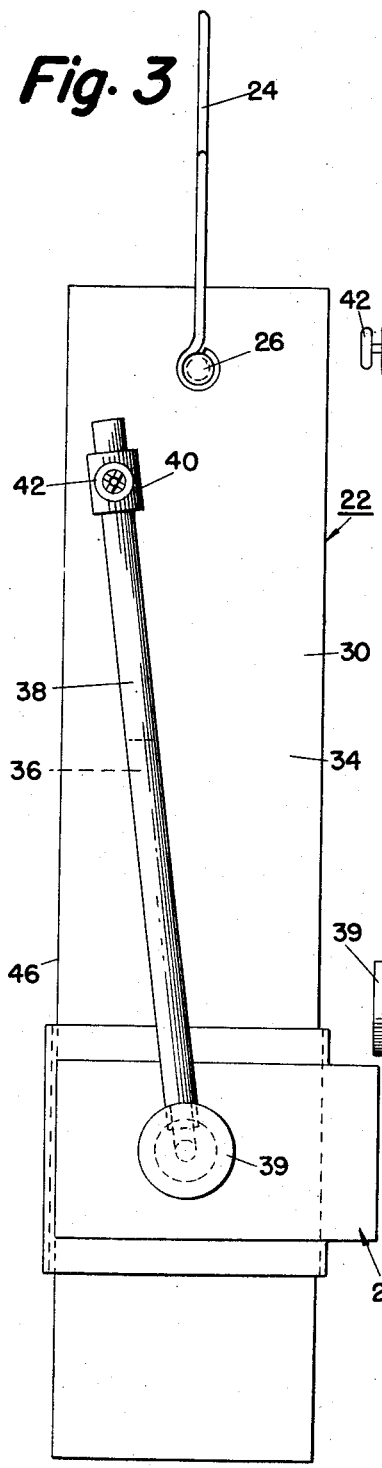
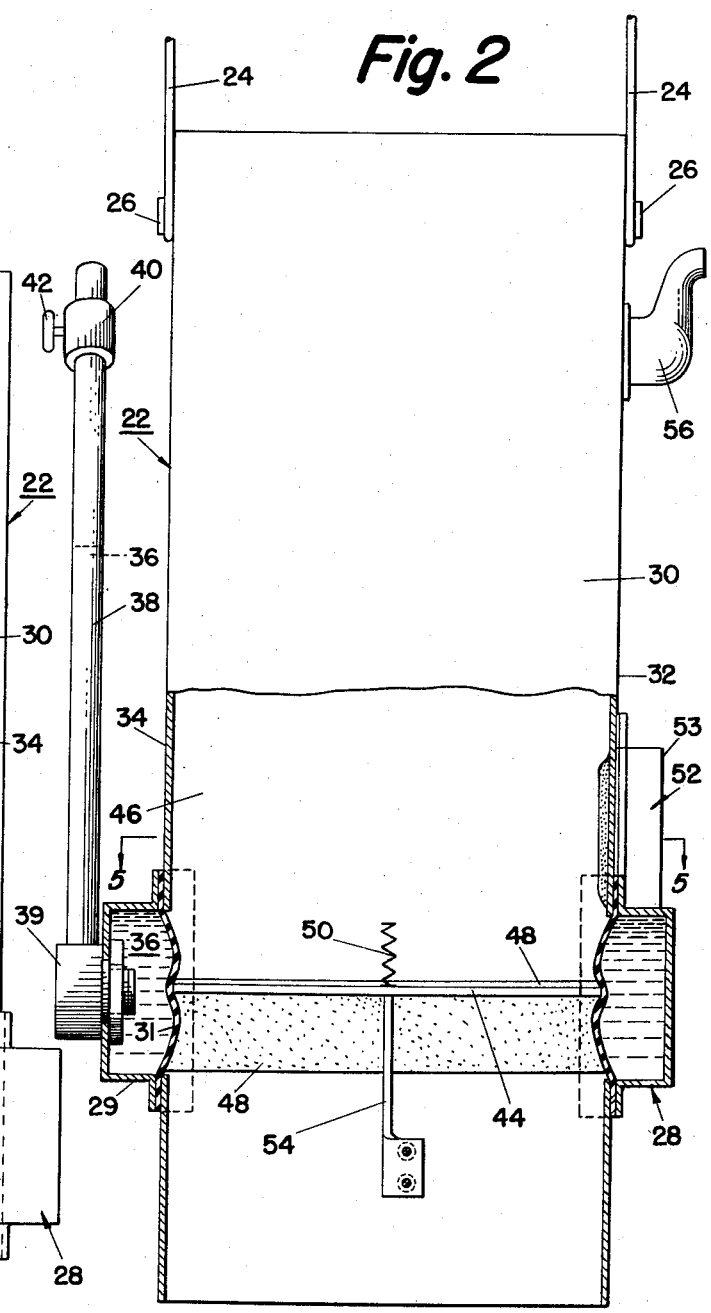
INVENTOR.
HAROLD A. QUIST
BY Robert O. Spindle
ATTORNEY

United States Patent Office 2,894,394
Patented July 14, 1959

2,894,394

SAMPLER FOR FOAM BLANKET COVERED LIQUIDS

Harold A. Quist, Swarthmore, Pa., assignor to Sun Oil Company, Philadelphia, Pa., a corporation of New Jersey Application June 12, 1956, Serial No. 590,865

10 Claims. (Cl. 73—425.4)

This invention relates generally to devices used for sampling fluent materials and more particularly to such devices which are used for determining the depth of a covering floated on stored bodies of liquid, such as a blanket formed of discrete materials.

In the petroleum and chemical industries liquids are frequently covered by such materials, for example micro balloons generally termed "foam blankets" which form a blanket for conservation and protective purposes. Normal sampling of the liquid contents covered by such blanketing material can be accomplished with well-known sampling mechanisms known to the industry as "thiefs." However, when these devices are used, the blanket of discrete material is ruptured by simple penetration and the thief is dropped to a selected level in the liquid to obtain the sample. On withdrawal, the typical theiving device is constructed to shed most of the blanketing material before removal, and no evidence of the depth of the blanket cover is obtained.

To obtain information relative to the satisfactory distribution and thickness of the blanket material, it is necessary, therefore, to use means other than the well-known liquid sampling devices.

The usefulness of these "foam blankets" depends on both the depth and uniformity with which the discrete material is applied to the stored liquid surface. For best results, the blanket covering, once formed, should remain undisturbed, or, at least, ruptured as little as possible. It is a characteristic of the discrete materials used for such purposes that they are "self-healing" if the covering is breeched for any purpose. The rapidity and thickness of such recovery depends on the force used and size of the disturbance. To secure the maximum advantage of such covering it is necessary, therefore, even when measuring the depth of the blanket itself, to disturb it as little as possible, and even then, to facilitate the self-healing feature by controlling the force of the disturbance to support the characteristic of self-healing to the utmost.

It is an object of this invention to provide a sampling device for use in determining the depth of blankets of discrete material covering liquids.

A further object is to provide a device to obtain samples of blanketing material which will minimize the disturbances of the blanket on penetration and removal thereby affording a correct measurement of the blanket depth and permitting unobstructed "healing" of the sample opening.

Yet a further object is to provide a sampling device responsive to the pressure of the liquid in which it is submerged.

And still another object is to provide a sampling device adjustable to operably respond to liquid pressure at predetermined depths.

Another object is to provide a sampling device which when closed to capture a sample at a selected depth by liquid pressure, the difference in pressure between that of the operating depth and the decreasing pressure experienced in removing the sampler from fluid contact will seal the device in the closed position.

Other objects and advantages will be set forth and pointed out in the specification read in conjunction with the drawing, in which—

Figure 2 is an elevational view of the device partly in section;

Figure 3 is an elevational view of one side of the device, partly in section;

Micro balloons, as one type of floated discrete material forming a blanket, are used to reduce vapor losses in stored volumes of volatile liquids. In theory a blanket of selected uniform thickness is spread to cover the entire exposed volatile liquid surface. Vapors from the volatile liquid pass through the discrete material, wetting the balloons, and thus form a reasonably resistant material-vapor cover retarding further vapor escape. It will be recognized that an economic thickness of such a blanket will be one which will balance the value of vapor loss against the cost of quantities of discrete material used. Once determined, most satisfactory results will be obtained by keeping such a covering at this economic depth, and uniformly distributed. It is the purpose of the device described here to enable periodic checks to be made of the blanket depth and distribution as a maintenance operation.

Figure 1:
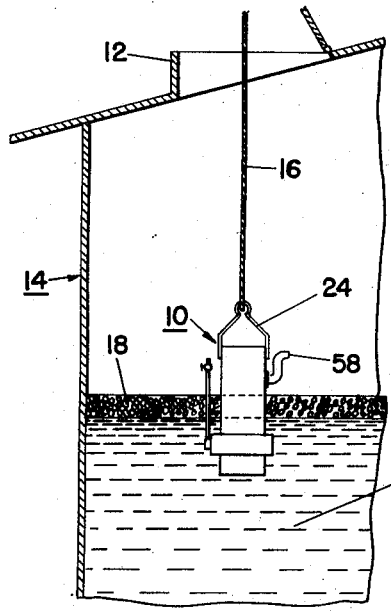
Figure 1 is an elevational view of the device in operation.

Referring to the drawing, Figure 1 is an elevational representation of the sampling device 10 of this disclosure in operation. It is lowered through a hatch opening 12 in storage tank 14 by suspending line 16. A depth of immersion is selected usually being that depth where the blanket layer 18 is enclosed within the device and sufficiently deep in the supporting liquid to cause the operating elements to function. Either entering or leaving the blanket layer in sampling operation is illustrated in this figure. The operations both above and below the surface of stored liquid 20 will be understood after reading the following detailed description.

Figure 2 shows the sampler in a preferred form. That other forms of the device are possible and practicable will be readily understood. For ease of manufacture and satisfactory operation with reduced maintenance, Figure 2 illustrates the sampler as comprising an elongate body 22 to which is affixed a bail 24, hinge-connected on opposite sides as by pivots 26—26. It is preferred to form the body 22 in rectangular cross-section as is evident from the other figures of the drawing. Such sectional form facilitates operation and particularly sealing after the sample is captured.

Figure 6:
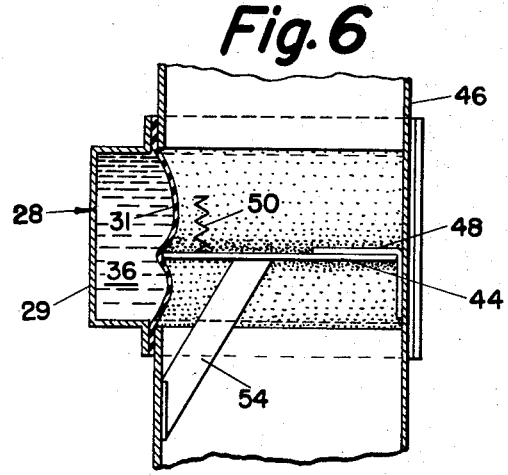
Figure 6 shows a portion of Figure 4 with the movable element in the closed position.

Proximate the bottom of the rectangularly shaped body 22, an expansile seal means 28 forms an insert extending peripherally across the front 30 and both sides 32 and 34 of the body. This seal means 28 has appreciable depth along the surfaces of the walls in which it is inserted. As shown here in Figure 2 and further detailed in Figures 4 and 6, seal means 28 includes a pocket-forming external member 29 of metal, plastic or other sufficiently rigid material which is designed to engage flexible diaphragm material 31 such as neoprene or other hydrocarbon resistant material. A liquid 36 fills the expansile seal means 28 and overflows into a tube 38 rotatably adjustable by means of a connector 39 as shown to change the vertical pressure effect of liquid 36 in the seal means, as more particularly detailed in Figures 2 and 3. A vent 40 with manually operable pet cock 42 closes the upper end of tube 38.

Figure 4:
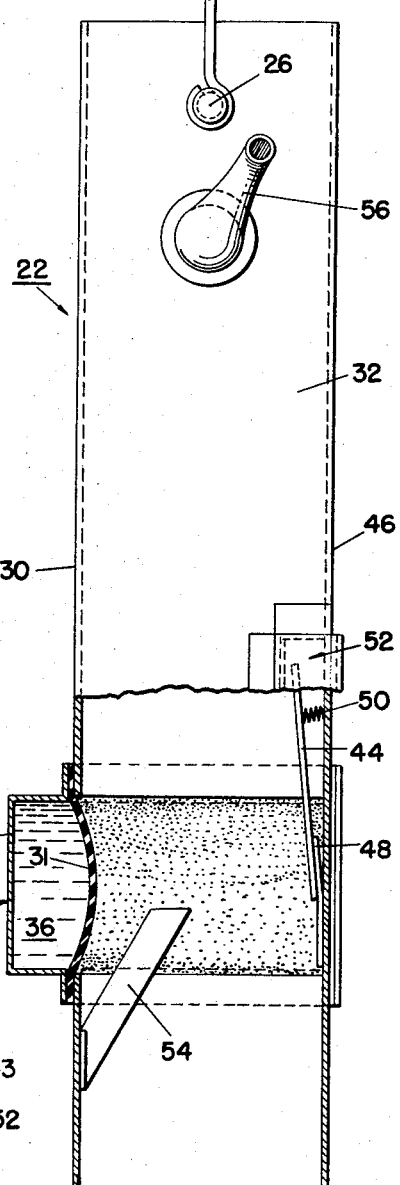
Figure 4 is an elevational view of the side opposite that of Figure 3, also partly in section.
Figure 5:
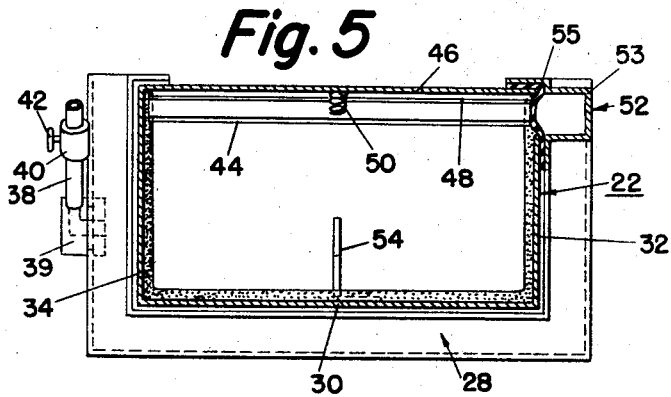
Figure 5 is a cross-sectional view of Figure 2 of the device taken on line 5—5.

Cooperating with the expansile sealing means 28, a shutter 44 is connected to the remaining or back wall 46 as by a hinge member 48. A small coil spring 50, or like resilient element, is mounted on the shutter 44 to press against the back wall 46 and forcefully urge the shutter from the open position once it is released. Holding the shutter in that open position as a latch means is an auxiliary expansile member 52 of material and operating characteristics similar to the expansile sealing means 28. As shown in Figures 2, 4 and 5, this auxiliary expansile member 52 is formed of a rigid exterior body portion 53 and (Fig. 5) sealably engages a section of flexible diaphragm material 55 which faces into the interior of the sampler body 22. This latch means is connected for transmission of liquid 36 from and to sealing means 28 for the operating effect of the liquid 36. A stop 54 supported by the body 10 prevents shutter 44 from moving past the best sealing position in the operating area of the expansile sealing means, once it is unlatched and released to the closed position.

At a selected depth above the shutter-seal combination and latch-release means, in any one or more of the four walls of the sampler body, a depth-adjustable overflow element 56 is let into the device. Within the limits of the length of the overflow element 56 which is shaped to extend above the connecting position and adapted to rotate about the connection, the depth of sampled material can be controlled. As will be understood after reading the operating description of the device and example of operation, such an arrangement either alone or in combination with the rotatably adjustable tube 38 affords considerable operating flexibility.

Referring to all the figures of the drawing, a discussion of the operation of the device will be clear. A wire line 16 is connected to the bail 24 of the sampler 10 for lowering through hatch 12. Shutter 44 is held open against the back wall 46 by the expansive latch means 52 forced into retaining engagement by the pressure of liquid 36 transmitted through tube 38 and in the seal means 28. The seal means 28 is distended also by the pressure of liquid 36 standing in tube 38, but is free to expand freely as shutter 44 is not embraced in its surfaces.

This expansive force of liquid 36 in tube 38 can be adjusted to suit the conditions of operation as determined by atmospheric pressure and the density of the liquid covered by the foam blanket. As noted above tube 38 is attached to the flexible seal means 28 through a rotatable connection. The pressure of the liquid 36 is directly proportional to the vertical distance through which the liquid is effective. As is evident this pressuring distance can be adjusted by rotating tube 38 through a proper arc. Further the vapor space in tube 38 above operating liquid 36 is vented to atmosphere through vent 40 immediately balancing the internal pressure in that portion of the tube with the atmospheric pressure effective on the stored contents of tank 14. With these adjustments made, the sampler, in the open position, is lowered into the tank.

Designed as an open tube, preferably rectangular in cross-section, the walls of the device cut through the blanket and supporting liquid with a minimum of disturbance. The shutter 44 is held back against the rear wall of the sampler body by the pressure effect of operating liquid 36 filling tube 38, sealing element 28 and latching means 52. As the sampler sinks lower into the stored liquid, the blanket having been penetrated as by a cookie cutter with a minimum of disturbance and that limited to a peripheral penetration of the sampler, the depth of the blanket material and liquid fills the portion of the sampler extending through the surface of the stored material exerting pressure, directly proportionate to the depth of penetration, on the seal means 28 and latch 52. Pressuring liquid 36 countered by the depth of stored liquid pressure in the sampler 22 is compressed by the diaphragms 31 and 55 rising in tube 38 and compressing the captured atmospheric condition secured by pet cock 42. Latch means 52 sufficiently compressed releases the shutter 44 which is pushed from the wall 46 by spring 50.

The depth selected by the person doing the sampling now being reached by the operating portion of the device, the top of the sampler still being above the blanket, upward movement of the device moves the shutter 44 into horizontal engagement with sealing means 28. As the pressure effect of the stored liquid in the sampler is now decreasing due to upward movement of the sampler, the sample-liquid pressure inside the device against the seal means 28 being reduced the required amount by permitting excessive sample liquid to escape through the adjusted depth outflow element 56 as it rises from the liquid, the effect of pressuring liquid 36 gradually reasserts itself, expanding the surface of seal means 28 into sealing engagement with shutter 44 as shown in the sectional figures. Lifting the sampler from the storage vessel withdraws the captured segment of blanket material for depth determination which can be readily measured. If desired the body of the sampler can be made transparent with a scale etched or marked thereon reducing the function of measuring to merely glancing at the sampler.

As the device leaves the stored liquid and blanket cover, it is necessary to control the depth of material retained in the body of the sampler. This is required to reduce the counteracting pressure effective on sealing means 28 so that the periphery of shutter 44 can be enclosed in the seal. As noted above, by making overflow 56 rotatable the level of the retained liquid and blanket material, and the counter-pressure resulting therefrom, can be controlled.

An example of the use of the disclosed sampling device will clarify its operation. It is planned to use the sampler to determine the depth of a micro-balloon covering on a body of crude oil in a storage tank. The specific gravity of crude oil is approximately .9. The operating liquid in the sampler is assumed as being a mixture of glycol and water having a specific gravity of 1.1. Adjustment of overflow element 56 permits an effective depth of sampled liquid (crude oil) to reach 5 inches (assumed). A working pressure figure effective inside the sampler is then represented by the product of the crude oil specific gravity multiplied by the effective depth in inches or 4.5.

As the immediately effective atmospheric pressure on the micro-balloon surface is balanced inside the operating-liquid tube 38 by venting with petcock 42, it need not be considered in these calculations. It then remains to determine where adjustable tube 38 is to be positioned to make the vertical column (effective depth) operable relative to the crude oil effect. As the specific gravity of the operating liquid in the sampler is assumed at 1.1, dividing the figure 4.5 shows a point of pressure equilibrium to be reached when the vertical pressure component is set at 4 inches. Thus the latch will release when the sampler reaches 4½ inches below the sample liquid level with a 4 inch setting for the operating liquid. A device about 12 inches long is evidently sufficient for most operations. However, this is not limiting.

While a specific embodiment of an improved sampler for testing the depth of discrete material covering stored liquid has been disclosed in the foregoing description, it will be understood that various modifications within the spirit of the invention may occur to those skilled in the art. Therefore it is intended that no limitations be placed on the invention except as defined by the scope of the appended claims.

The invention claimed is:

1. A liquid sampling device comprising an open elongate body having suspension means connected thereto, a hinge-connected shutter positioned at a depth in the body to retain a substantial sample therein, a liquid filled chamber normally pressure-extended to engage and retain the shutter in an open position subject to being compressed by pressure of the sampled liquid at a preselected depth, and means positioned to sealably engage said shutter in a closed position after release by said liquid filled pressure response chamber.

2. The liquid sampling device of claim 1 further characterized by said means to sealably engage the shutter in the closed position including a pressure responsive sealing means adapted to peripherally engage in sealing contact the free edges of the shutter in the closed position, and means to support operative pressure on said pressure-responsive sealing means effective to extend the same into sealing contact with the shutter periphery on decrease of the pressure of the submerging liquid by upward movement of the sampling device.

3. The liquid sampling device of claim 2 further characterized by said means to support operative pressure on the diaphragm on removal of the device from the submerging liquid including in combination an adjustably positioned tube connected to the diaphragm for varying the effective depth of operating fluid transmitted to said diaphragm, and an outlet for the elongate body adjustable to regulate the depth of liquid retained therein as a sample.

4. A liquid sampling device comprising an elongate tubular body rectangular in section having suspension means attached, a hinge-connected shutter positioned to capture a sample in said body, pressure-responsive releasing means to operate said shutter at a selected liquid depth, distendable sealing means positioned about the wall of the tubular body at the elevation of the shutter in closed position, and means to urge the sealing means into sealing engagement with the shutter to retain the liquid sample.

5. The liquid sampling device of claim 4 further characterized by the means urging the distendable sealing means into sealing engagement with the shutter including a tube connecting with said means in which a fixed amount of pressuring liquid is contained, effective to expand the means when the pressure of the submerging liquid is reduced.

6. The liquid sampling device of claim 5 further characterized by the tube containing the pressuring liquid for internally pressuring the diaphragm being adjustable to vary the amount of effective pressure for operation at different depths in the submerging liquid.

7. The liquid sampling device of claim 5 further characterized by the means urging the distendable means into sealing engagement with the shutter including the tube of pressuring liquid connecting with said means to exert internal pressure combined with an overflow means operatively connected to the sample containing portion of the tubular body positioned to reduce the pressure of the captured sample on removal from the submerging liquid to more effectively expand the sealing diaphragm.

8. The liquid sampling device of claim 7 further characterized by the overflow connection being adjustable to regulate the effective pressuring depth of the captured sample in combination with the variable internal pressure distendable means.

9. A sampling device for stored liquid bodies covered with a blanket layer of discrete, floated material comprising a tubular body of rectangular cross-section having suspension means connected thereto, a hinged shutter supported internally of said tubular body and positioned therein to capture a composite sample of liquid and discrete covering material of desired depth, pressure responsive latch means holding said shutter open until the device reaches a depth in the liquid to be sampled where the liquid pressure counteracts the latching pressure and releases the shutter, and flexible pressure responsive means peripherally disposed in said tubular body to receive the unattached edges of the shutter, said means being collapsed by the pressure of submerging liquid and distendable by internal pressure into sealing engagement with said shutter as the device is raised in the liquid body thereby decreasing the opposing pressure of the same.

10. The device of claim 9 being further characterized by means for varying the operative pressure response of the peripherally disposed sealing means permitting use at different depths in the liquid body.

References Cited in the file of this patent

UNITED STATES PATENTS

| | | |
|---|---|---|
| 2,001,922 | Pribble | May 21, 1935 |
| 2,137,128 | Blake | Nov. 15, 1938 |
| 2,436,737 | White et al. | Feb. 24, 1948 |
| 2,515,882 | McClusky | July 18, 1950 |
| 2,782,640 | Croft et al. | Feb. 26, 1957 |